(12) United States Patent
Bergeson et al.

(10) Patent No.: US 6,784,890 B1
(45) Date of Patent: *Aug. 31, 2004

(54) ACCELERATED GRAPHICS PORT EXPEDITE CYCLE THROTTLING CONTROL MECHANISM

(75) Inventors: Brian L. Bergeson, Folsom, CA (US); Zohar Bogin, Folsom, CA (US); Vincent E. VonBokern, Rescue, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 749 days.

(21) Appl. No.: 09/033,529

(22) Filed: Mar. 2, 1998

(51) Int. Cl.[7] ............................................... G06F 13/18
(52) U.S. Cl. ........................ 345/535; 345/503; 345/520; 345/531; 711/150; 711/151; 710/241
(58) Field of Search .................................. 345/501–503, 345/520–521, 526, 535, 541, 531; 710/29, 40, 41, 45, 49, 60, 107, 112, 113, 116–118, 129, 130, 240, 241, 262, 264, 33–35, 244; 711/150–152, 158, 163

(56) References Cited

U.S. PATENT DOCUMENTS

| | | | |
|---|---|---|---|
| 5,099,420 A | * 3/1992 | Barlow et al. ............... 710/119 |
| 5,131,081 A | * 7/1992 | MacKenna et al. ........... 710/22 |
| 5,193,193 A | * 3/1993 | Iyer ............................ 710/107 |
| 5,423,020 A | * 6/1995 | Vojnovich .................... 710/22 |
| 5,444,855 A | * 8/1995 | Thompson ................... 710/107 |
| 5,463,624 A | * 10/1995 | Hogg et al. ................. 370/461 |
| 5,528,513 A | * 6/1996 | Vaitzblit et al. ............. 709/103 |
| 5,577,214 A | * 11/1996 | Bhattacharya .............. 710/107 |
| 5,613,075 A | * 3/1997 | Wade et al. ................. 710/107 |
| 5,649,161 A | * 7/1997 | Andrade et al. ............ 711/167 |
| 5,649,232 A | * 7/1997 | Bourekas et al. ............. 710/60 |
| 5,748,983 A | * 5/1998 | Gulick et al. ................. 710/22 |
| 5,767,862 A | * 6/1998 | Krishnamurthy et al. ... 345/507 |
| 5,784,569 A | * 7/1998 | Miller et al. ................. 709/235 |
| 5,797,020 A | * 8/1998 | Bonella et al. ............. 710/240 |
| 5,862,353 A | * 1/1999 | Revilla et al. .............. 710/107 |
| 5,911,051 A | * 6/1999 | Carson et al. .............. 710/107 |
| 5,919,268 A | * 7/1999 | McDonald .................... 714/47 |
| 5,936,640 A | * 8/1999 | Horan et al. ................. 345/501 |
| 5,953,685 A | * 9/1999 | Bogin et al. ................. 710/36 |
| 5,956,493 A | * 9/1999 | Hewitt et al. ............... 711/113 |
| 5,996,034 A | * 11/1999 | Carter ........................ 710/100 |
| 6,006,303 A | * 12/1999 | Barnaby et al. ............ 710/244 |
| 6,028,841 A | * 2/2000 | Lyon et al. .................. 370/232 |
| 6,078,338 A | * 6/2000 | Horan et al. ................. 345/521 |
| 6,122,693 A | * 9/2000 | Gutta et al. ................. 710/107 |
| 6,141,765 A | * 10/2000 | Sherman ..................... 713/400 |

* cited by examiner

Primary Examiner—Ulka J. Chauhan
(74) Attorney, Agent, or Firm—Blakely, Sokoloff, Taylor & Zafman LLP (57) ABSTRACT

A method for controlling expedite cycles having the steps of determining the number of clock cycles devoted to expedite data transfer requests made to a component during a predetermined monitoring window and guaranteeing a minimum number of clock cycles processing non-expedite requests during the monitoring window.

42 Claims, 7 Drawing Sheets

FIXED PRIORITY:
EXPEDITE AGP
OTHER HIGH PRIORITY REQUESTS

ROTATING PRIORITY:
CPU/PCI READS
NORMAL AGP
OTHER ROTATING MEDIUM PRIORITY REQUESTS

FIXED PRIORITY:
VARIOUS LOW PRIORITY REQUESTS

ACCELERATED GRAPHICS PORT EXPEDITE CYCLE THROTTLING CONTROL MECHANISM

BACKGROUND OF THE INVENTION (1) Field of the Invention

The field of the invention is data access control in computer systems; more specifically, the present invention is related to a method and apparatus for an accelerated graphics port (AGP) expedite cycle throttling control mechanism.

(2) Related Art

Currently available computer systems typically have a graphics device capable of processing graphics data for display on a display device. In order to provide an uninterrupted flow of graphics data for display on a display device, a graphics device must be given high priority to access the system memory for graphics instructions and data. Other devices also vying for the system memory may then be potentially starved out during long streams of graphics cycles to the system memory by the graphics device.

To overcome this problem, the prior art stops the graphics cycles from further processing if the graphics cycles continue consecutively for more than a predetermined period. The disadvantage of the prior art is that there can be as few as one clock cycle with no graphics cycles during the predetermined period and the remaining time in the predetermined period may be devoted to graphics cycles preventing other devices from accessing the system memory.

It is therefore desirable to have a method and apparatus which guarantees a specified period of time for non graphics cycles to be processed. This protects latency sensitive devices from undue delay in accessing a system memory while minimizing added latency to graphics cycles.

BRIEF SUMMARY OF THE INVENTION

A method for controlling expedite cycles having the steps of determining the number of clock cycles devoted to expedite data transfer requests made to a component during a predetermined monitoring window and guaranteeing a minimum number of clock cycles for processing non-expedite requests during the monitoring window.

BRIEF DESCRIPTION OF THE DRAWINGS

FIG. 2a is a block diagram illustrating one embodiment of a portion of the internal components comprising the memory controller illustrated in FIG. 1a.

DETAILED DESCRIPTION OF THE INVENTION

Expedite accelerated graphics port (AGP) device cycles to a system memory typically have higher priority than central processing unit (CPU) and peripheral component interconnect (PCI) cycles to the system memory. The present invention protects the CPU/PCI device cycles to the system memory from being starved out during a long stream of expedite AGP device cycles to the system memory. The present invention throttles the signals to a dynamic random access memory (DRAM) arbiter which indicates that an AGP cycle has expedite priority. At the same time, the present invention minimizes the probability of increasing AGP expedite latency and protects latency sensitive devices on the PCI from failure due to starvation.

Figure 1A:
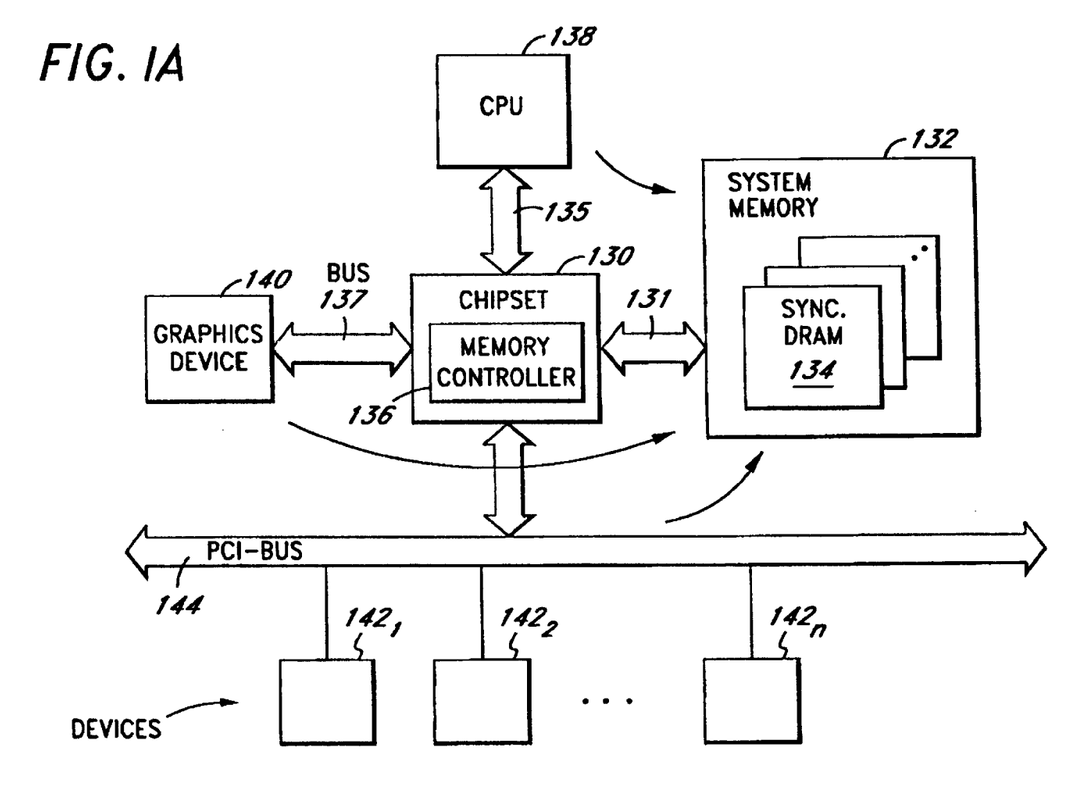
FIG. 1a is an exemplary system block diagram illustrating one embodiment of the present invention.

FIG. 1a illustrates an exemplary block diagram of a computer system with the throttling mechanism of the present invention. More specifically, in one embodiment, a chipset 130 has a memory controller 136 and is coupled to a system memory 132 by bus 131. In one embodiment, the system memory has dynamic random access memory (DRAM)'s 134 which may be synchronous DRAM's. In an alternate embodiment, the system memory 132 may have an extended data out dynamic random access memory (EDODRAM). The memory controller 136 couples the system memory 132 to various devices including a central processing unit (CPU) 138 such as an Intel Pentium® II processor coupled by a bus 135, a graphics device 140 coupled by an accelerated graphics port (AGP) 137 (referenced as bus 137), and a plurality of peripheral component interconnect (PCI) devices $142_1$ through $142_N$ coupled by a bus 144. Although not shown, a person skilled in the art may appreciate that the system may also include various other components typically found in a computer system.

The PCI devices $142_1$ through $142_N$ are Input/Output (I/O) hardware devices that are coupled to the system through a PCI expansion connector (not shown) or mounted to a personal computer (PC) motherboard (not shown). Examples of PCI or other I/O devices include, but are not limited to a graphic controller/card, a disk controller/card, a local area network (LAN) controller/card and a video controller/card. The graphics device 140 is coupled to the system memory 132 through the memory controller 136. In one embodiment, the graphics device 140 is designed to optimize the graphics data transfer operations in high speed personal computers (PC).

The memory controller 136 provides the CPU 138, the graphics device 140 and the PCI devices $142_1$ through $142_N$ access to the system memory 132. For example, on a data write transaction, a write request as well as the data to be written to the system memory 132 are passed to and processed by the memory controller 136. On a read transaction, a read request is passed to the memory controller 136 and the data requested is sent back from the system memory 132 to the requesting component such as the CPU 138, the graphics device 140 and/or the PCI devices $142_1$ through $142_N$.

Although the chipset 130 is illustrated as having a memory controller 136, in another embodiment the chipset 130 may also include a host bridge connecting the system memory 132 to various components such as, for example, the CPU 138, PCI devices $142_1$ through $142_N$ and the graphics device 140. In yet another embodiment, the chipset 130 may have one or more bus (e.g., PCI bus) controller, a graphics (e.g., AGP) controller and a CPU controller in addition to the memory controller 136 to control data access between various components such as, for example, a bus and graphics device 140, the system memory 132 and the CPU 138.

Figure 1B:
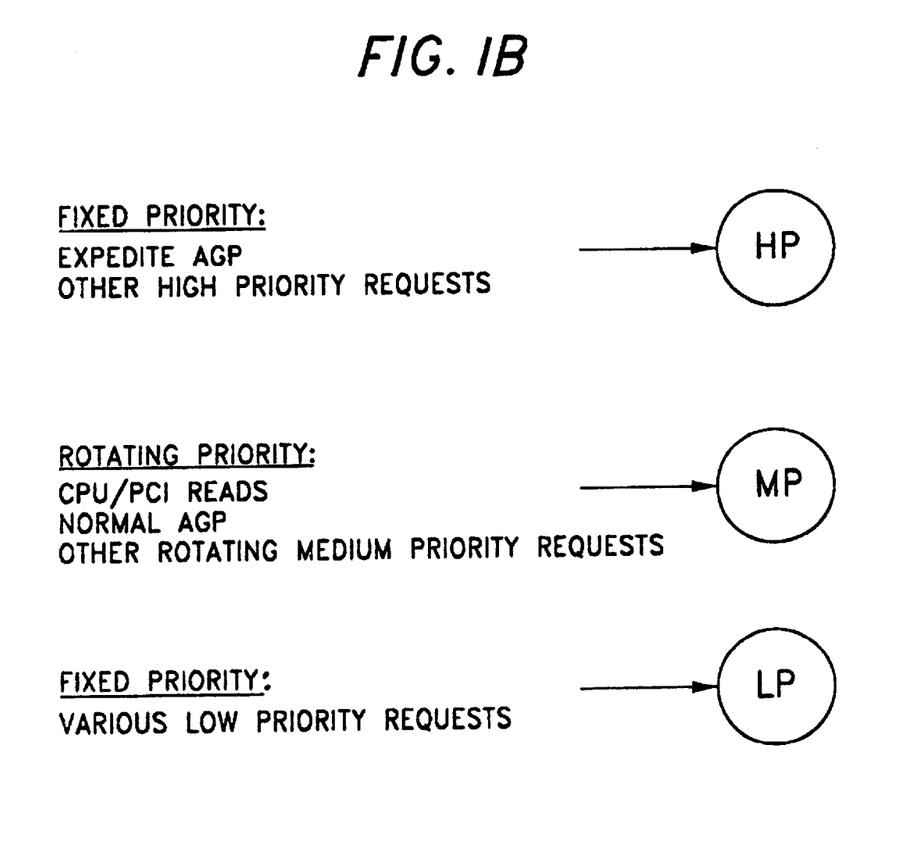
FIG. 1b illustrates one embodiment of the memory arbitration scheme of the present invention.

FIG. 1b illustrates an exemplary arbitration scheme which may be followed by a computer system with the implementation of the present invention for controlling throttling of AGP expedite cycles. In one embodiment of the computer system of the present invention, three different priority levels are provided. The priority levels are high priority, medium priority and low priority. The priority levels indicate the priority at which certain actions are allowed to be processed. For example, such actions include access to the system memory 132 by a device such as the CPU 138, the PCI devices 142$_1$ through 142$_N$ and graphics device 140. In the given embodiment, expedite AGP requests are high priority. Normal AGP requests along with CPU/PCI reads are given medium priority.

Typically, as illustrated in FIG. 1b, expedite AGP cycles are given higher priority than CPU and PCI cycles. When the CPU or PCI cycles are being starved out, the present invention drops the priority of the expedite AGP cycles from high priority to medium priority (to normal AGP cycles). This allows a CPU or PCI cycle to compete to own access to the system memory 132 with the same level of priority as the normal AGP cycles.

Figure 2A:
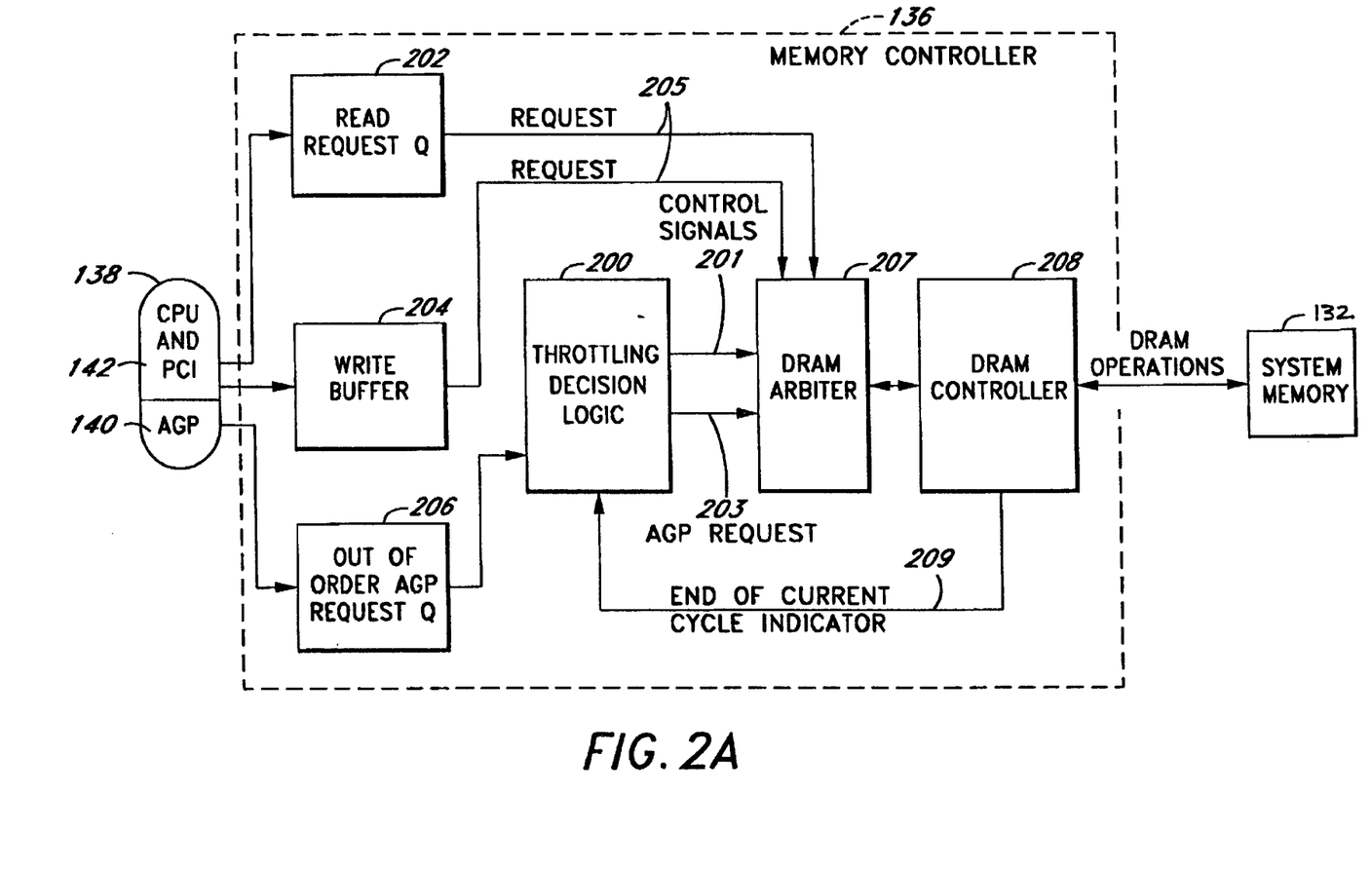

FIG. 2a is a functional block diagram of one embodiment of a memory controller of the present invention. A throttling decision logic 200 is coupled to an AGP request data queue 206. The throttling decision logic 200 monitors the priority and access rate of AGP requests to the system memory 132 and guarantees that non-expedite cycles are processed for a predetermined minimum time period within a given monitoring window. A monitoring window is a predetermined duration of time during which requests to the system memory 132 are monitored to determine the number of expedite and non-expedite requests made.

A read request queue 202 contains a plurality of read requests made by various system components. A write buffer request queue 204 contains a plurality of write requests made by various system components. An out of order AGP request queue 206 contains both AGP read requests and write requests made by the graphics device 140 through the AGP 137.

The throttling decision logic 200 is coupled to a dynamic random access memory (DRAM) arbiter 207 which passes on the AGP read/write requests to a DRAM controller 208. The DRAM controller 208 performs DRAM operations to the system memory 132. DRAM operations include but are not limited to read and write requests to the system memory 132. The DRAM arbiter 207 receives control signals 201 from the throttling decision logic 200 which specifies the timing and the duration that the DRAM arbiter 207 is to hold the processing of expedite AGP requests to allow non-expedite cycles to be processed for a guaranteed minimum period of time within a given monitoring window. In one embodiment, the throttling decision logic 200 receives an end of current cycle indicator 209 from the DRAM controller 208 indicating the end of processing a current cycle. The end of current cycle indicator 209 ensures that requests are not throttled (masked) in the middle of processing a given cycle.

Figure 2B:
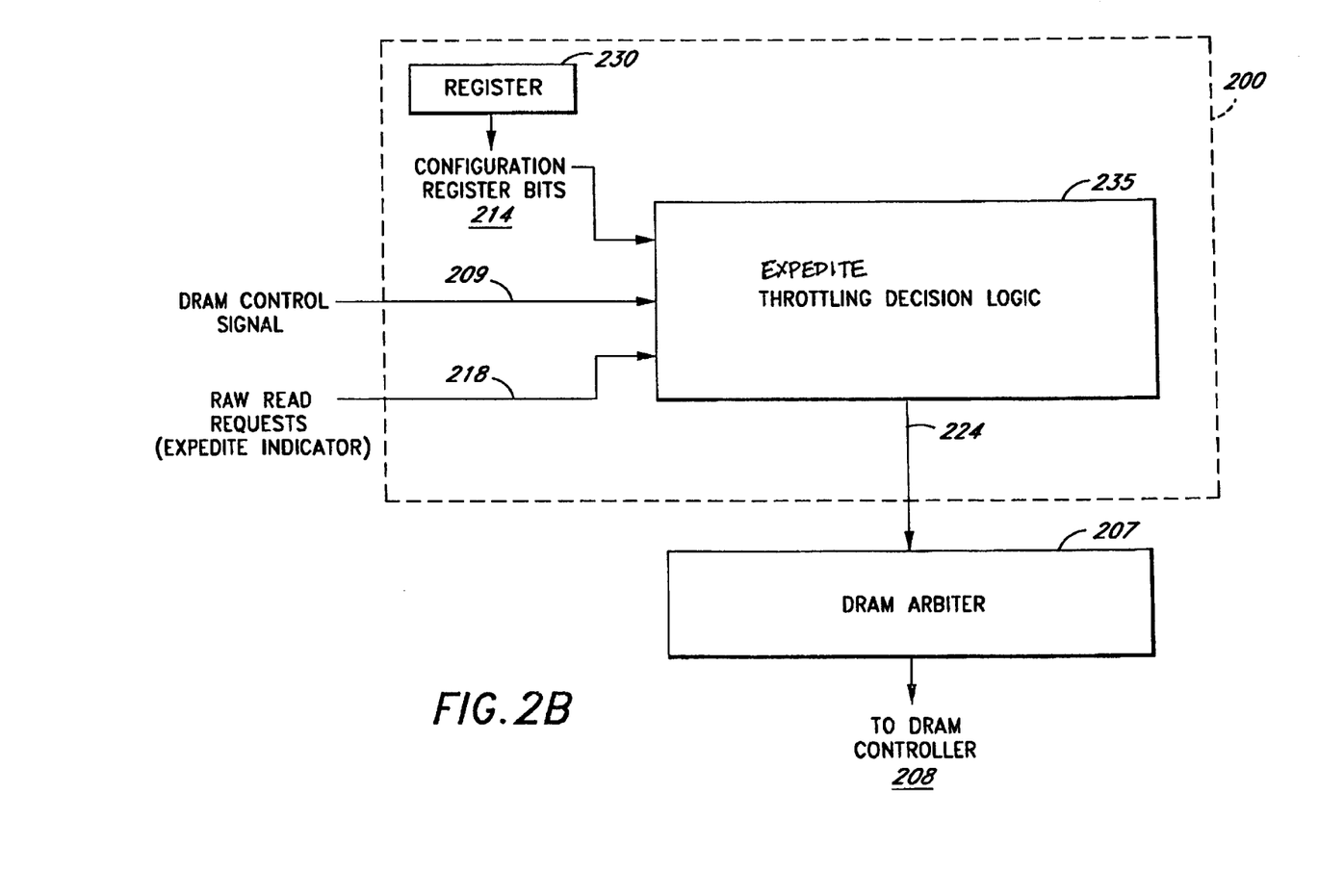
FIG. 2b is a block diagram of one embodiment of a throttling decision logic coupled to a DRAM arbiter of the memory controller.

FIG. 2b illustrates one embodiment of the throttling decision logic of the present invention. The throttling decision logic 200 has an expedite throttling register 230 with configuration register bits 214 which are predefined values including the length of the monitor and non-expedite windows and are used to determine whether an expedite AGP cycle should be throttled. The various register bits which are the source of the configuration register bits are illustrated in more detail in the block diagram of FIG. 2c.

The configuration register bits 214 are provided to an expedite throttling decision logic 235 which also receives an AGP cycle priority indicator 218 from the out of order AGP request queue 206. In one embodiment, the expedite throttling decision logic 235 is provided with an end of current cycle indicator 209 (DRAM control signal) from the DRAM controller 208. Once the expedite throttling decision logic 235 is ready to throttle expedite cycles, the throttling decision logic 200 generates a signal to the DRAM arbiter 207 to limit the expedite AGP cycles to be processed to guarantee that non-expedite cycles are processed for a predetermined minimum period during a given monitoring window.

Figure 2C:
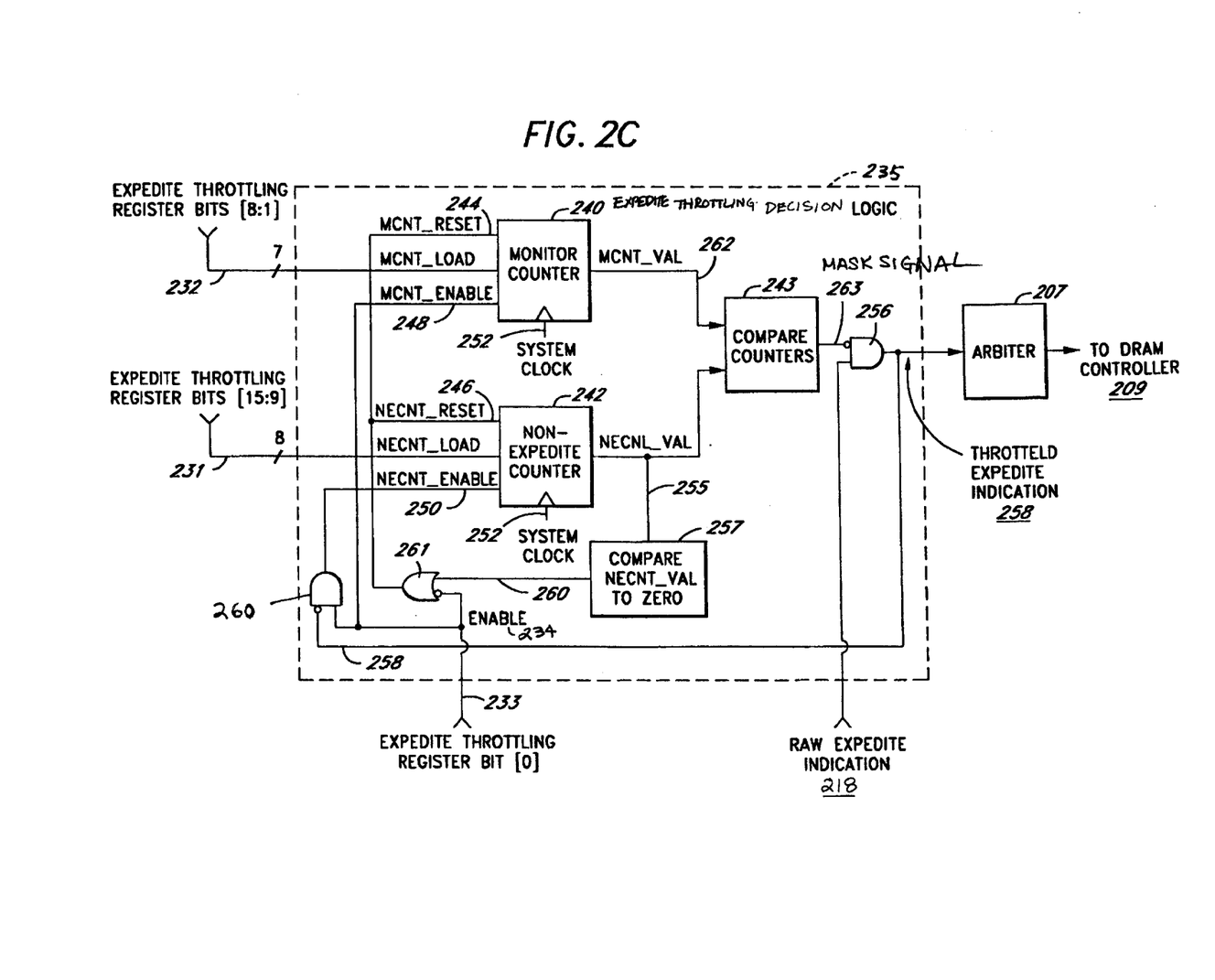
FIG. 2c illustrates one embodiment of the present invention's throttling logic in more detail.

FIG. 2c is a block diagram of one embodiment of the expedite throttling decision logic in more detail. As was illustrated in FIG. 2b, the throttling decision logic 200 of the present invention has an expedite throttling register 230 and an expedite throttling decision logic 235. The expedite throttling decision logic 235 has two counters. Namely a monitor counter 240 and a non-expedite counter 242. Both counters are provided with clock signals by a system clock 252. The monitor counter 240 counts a predetermined monitoring window period. A predetermined non-expedite period within the monitoring window period is guaranteed by the present invention to be provided to non-expedite cycles.

In one embodiment, the expedite throttling register 230 has a nonexpedite counter value (necnt_load value) 231, a monitor counter value (mcnt_load value) 232 and an expedite throttling register bit 233. The necnt_load value 231 is loaded as input to the non-expedite counter 242 every time the non-expedite counter 242 is reset. The mcnt_load value is loaded as input to the monitor counter 240 every time the monitor counter 240 is reset.

A mcnt_reset 244 is a reset signal line input to the monitor counter 240 and an necnt_reset 246 is a reset signal line input to the non-expedite counter 242. A reset signal is asserted on both the mcnt_reset 244 and necnt_reset 246 any time the non-expedite count is a 0 (zero) or when expedite throttling is disabled. In one embodiment, a comparator 257 compares the non-expedite value (necnt_val) 255 to 0 and outputs a signal of 1 if the necnt_val 255 is 0. The output 260 is asserted when necnt_val 255 is equal to 0. This output 260 is then OR'd with an inverted enable signal from the expedite throttling register bit 233 through an OR gate 261. The mcnt_reset 244 and the necnt_reset 246 is high if the output 260 is high and/or if the enable signal 234 from the expedite throttling register bit 233 is low. The reset signal resets both the monitor counter 240 and the non-expedite counter 242 to the mcnt_load value 232 and the necnt_load value 231 respectively.

An mcnt_enable 248 and an necnt_enable 250 are decrement enable signal lines provided to the monitor counter 240 and the non-expedite counter 242 respectively. The monitor counter 240 value is decremented while the mcnt_enable 248 is asserted. The mcnt_enable 248 stays asserted as long as the expedite throttling is enabled as indicated by the expedite throttling register bit 233.

The necnt_enable 250 is asserted if a throttled expedite indication signal 258 is low. The throttled expedite indication signal 258 is low if there is no expedite request or if the current expedite request is being masked. The non-expedite counter 242 value is decremented if the necnt_enable 250 is asserted. In one embodiment, an inverted throttled expedite indication signal 258 is AND'ed through an AND gate 260 with the enable signal 234 from the expedite throttling register bit 233. The necnt_enable 250 is high if the throttled expedite indication signal 258 is low and the enable signal 234 is high.

The monitor count value (mcnt_val) 262 and the necnt_val 255 are continually presented to a counter value comparator 243. The counter value comparator 243 compares the mcnt_val 262 and the necnt_val 255 and outputs a mask signal 263 of 1 if the values are equal. The mask signal 263 is inverted and provided to an AND gate 256 to be AND'ed with a raw expedite indication signal 218. The raw expedite indication signal 218 is provided by each access request to the system memory 132 and indicates whether the request is expedite or not. The expedite priority of an AGP request is masked as indicated by a low throttled expedite indication signal 258 if the mask signal 263 is high indicating that the mcnt_val 262 and the necnt_val 255 are equal.

The throttled expedite indication signal 258 is then provided to the DRAM arbiter 207. If the mcnt_val 262 and the necnt_val 255 are equal, then the raw expedite indication signal 218 is masked. The DRAM arbiter 207 therefore is never made aware of the expedite status of the request and processes the request as a normal AGP cycle. In this way, the expedite cycle is lowered to normal priority which allows cycles such as a CPU or PCI cycle to compete to own access to the system memory with the same level of priority as the normal AGP cycles.

Figure 3:
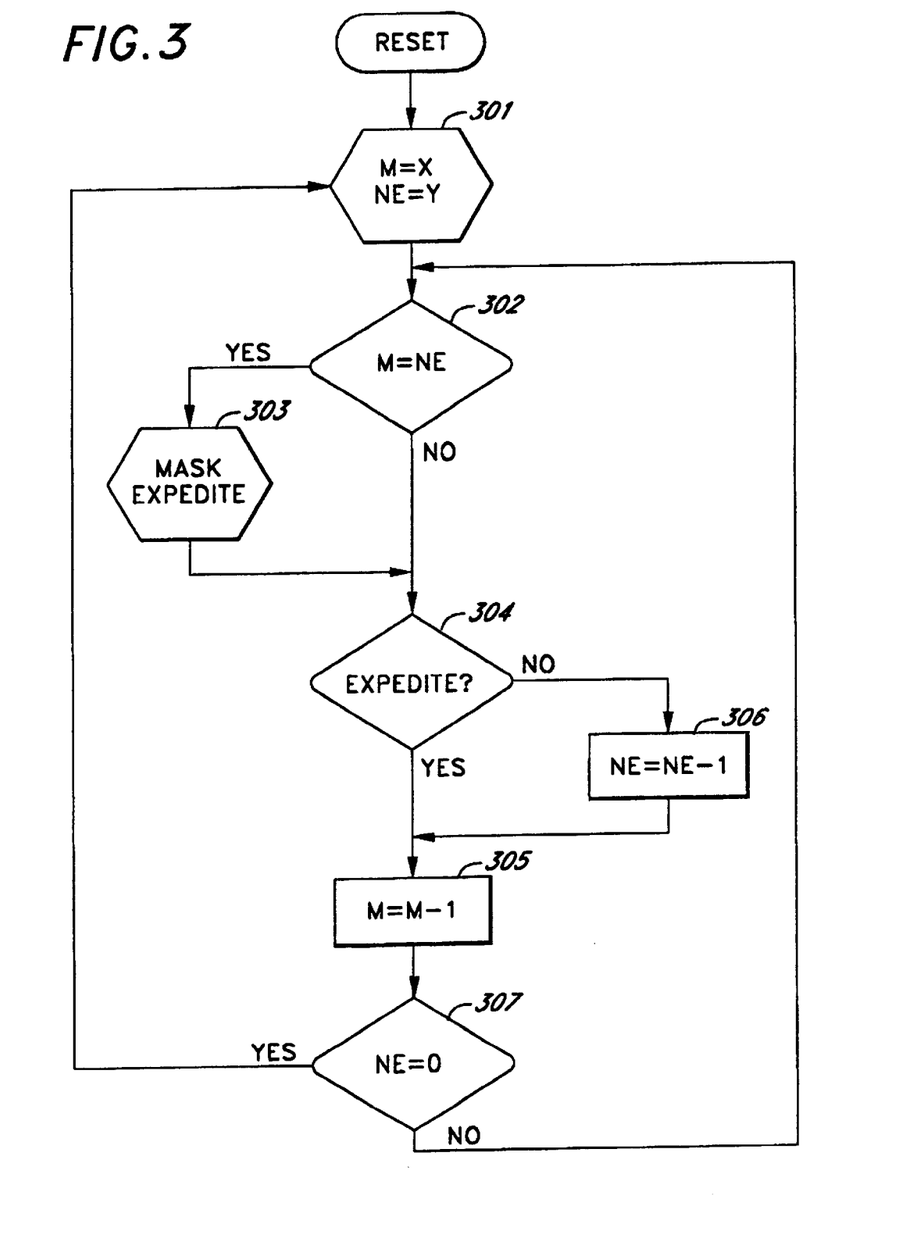
FIG. 3 is a flow diagram illustrating the general steps followed by one embodiment of the present invention for controlling throttling of AGP expedite cycles.

FIG. 3 is a flow diagram illustrating the general steps followed by one embodiment of the present invention. In one embodiment of the present invention, the throttling decision logic 200 includes two counters. One counter is the monitor counter 240 for counting a predetermined monitoring window period. The other counter is the non-expedite counter 242 which monitors a predetermined number of non-expedite cycles occurring within a monitoring window period.

For illustrative purposes, a monitoring window which is the default value for the monitor counter 240 is set to X and the non-expedite portion of the monitoring window which is the default value for the non-expedite counter 242 is set to a Y value which is less than X in the flow diagram to represent predetermined default values for the monitoring window and the non-expedite period.

In step 301, the monitor counter 240 value X and the non-expedite monitor counter 242 value Y are reset to pre-determined values. In step 302, if the monitor counter 240 value X is equal to the non-expedite counter 242 value Y, then in step 303, the expedite cycles are masked. Otherwise, the expedite cycles are not masked.

In step 304, if the request being processed is an expedite AGP cycle, then the monitor counter 240 value X is decremented by one in step 305. Otherwise, the request is a non-expedite cycle and the non-expedite counter 242 value Y is decremented by one in step 306 and the monitor counter 240 value X is also decremented by one in step 305.

In step 307, if the non-expedite counter 242 value Y is equal to 0, then the process returns to step 301 and both the monitor counter 240 value X and the non-expedite counter 242 value Y are reset to their predetermined default values and the entire process repeats. Otherwise if the non-expedite counter 242 value Y has not yet reached 0, then the process returns to step 302 and the monitor counter 240 value X and the non-expedite counter 242 value Y are compared to determine whether they are equal.

The monitor counter 240 value is always decremented and the non-expedite counter 242 value is only decremented if the throttled expedite indication signal 258 is low and masking of a current request being processed only occurs if the two counter values are equal. In this way, the present invention guarantees that there is a minimum number of non-expedite cycles in a given monitoring window.

In an alternate embodiment, the number of expedite and non-expedite requests made may be counted in lieu of counting the number of clock cycles used on expedite and non-expedite requests. In such an embodiment, a predetermined minimum number of non-expedite requests must be processed within a given monitoring window. The implementation of the embodiment may be understood by a person skilled in the art given the detailed description of the present invention provided herein.

Figure 4A:
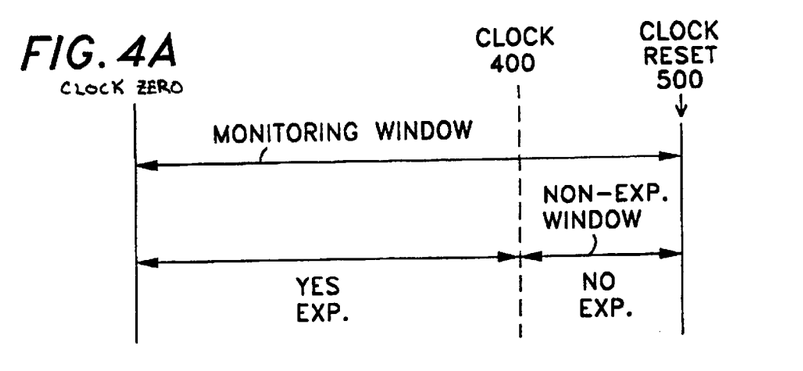
FIGS. 4a to 4c illustrate exemplary monitoring windows with guaranteed non-expedite cycles as may occur in three different cases.
Figure 4B:
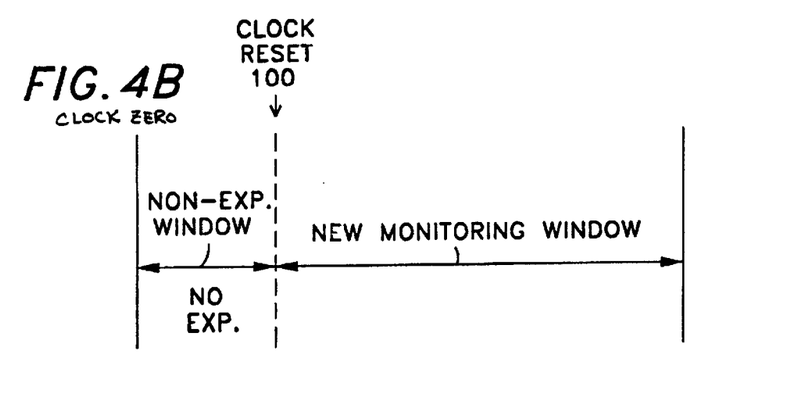
Figure 4C:
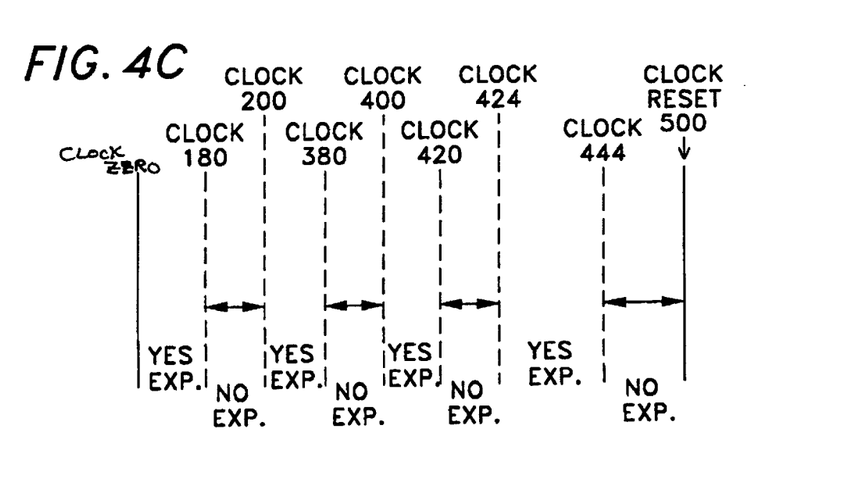

FIGS. 4a through 4c illustrate an exemplary monitoring window with the non-expedite period(s) occurring in different portions of the monitoring window. The three FIGS. illustrate three different cases which may occur during processing of expedite and non-expedite cycles by the present invention's throttling mechanism. For illustrative purposes, the default values for the monitor window counter 240 value X is set for 500 clock cycles and the non-expedite counter 242 value Y set to 100 clock cycles. The monitor counter 240 value should always be greater than the non-expedite counter 242 value. In this example, it is guaranteed that at least 20% (Y/X*100 =20%) of the monitoring window period is devoted to processing non-expedite cycles. In other words 20% of the DRAM bandwidth is arbitrated for without the throttled expedite indication signal 258 indicative of an expedite request being asserted.

FIG. 4a is illustrative of a case where consecutive expedite cycle requests are made from the beginning of a monitoring window until a maximum period for processing expedite cycle requests in the monitoring window is reached. At that time, the remainder of the monitoring window is given to non-expedite cycle requests by masking the expedite indication signal 218.

At clock 0, the monitor counter 240 value X equals 500 and the non-expedite counter 242 value Y equals 100. After 400 clock cycles of expedite cycles, the monitor counter 240 value X has been decremented to 100. The non-expedite counter 242 value Y remains at 100 since the non-expedite counter 242 only decrements when the request is a non-expedite cycle. In this illustrated exemplary case, all the requests between clock 0 and clock 400 are expedite cycle requests. Thus, the only value decremented thus far is the monitor counter 240 value X.

At this point, since X and Y are equal, all subsequent expedite requests are masked and the non-expedite counter 242 begins decrementing its value. At clock 500, the monitor counter 240 value X and the non-expedite counter 242 value Y are 0. With the present invention, when the non-expedite cycles are given the guaranteed minimum period for processing within a monitoring window (i.e. non-expedite counter value=0), the next monitoring window is initiated. Since the non-expedite counter 242 value Y equals 0 indicating that the non-expedite cycles have been given the guaranteed minimum period for processing in the monitoring window X, both the monitor counter 240 value X and the non-expedite counter 242 value Y are reset to their default values of 500 and 100 respectively and a new monitoring window is initiated.

FIG. 4b illustrates a case in which a stream of non-expedite requests use up the guaranteed period of the monitoring window at the beginning of the monitoring window. At clock 0, the monitor counter 240 value X is equal to 500 and the non-expedite counter 242 value Y is equal to 100. In this example, non-expedite cycles are processed during its guaranteed minimum period in the first 100 clock cycles of the given monitoring window.

At clock 100, the monitor counter 240 value X equals 400 and the non-expedite counter 242 value Y equals 0 indicating that the guaranteed minimum period has been utilized by the non-expedite cycles. Since the guaranteed minimum has been satisfied, both X and Y values are now reset to their default values at clock 101 and a new monitoring window is initiated In this case, there are no expedite requests being made by the AGP and the monitor counter 240 value X and the non-expedite counter 242 value Y are made to decrement until the non-expedite counter 242 value reaches 0. At this point, the values are reset. No masking (throttling) is required in this case.

FIG. 4c illustrates a case in which non-expedite requests are made intermittently in a given monitoring window. In such a case, masking is asserted at the end of the monitoring window to make up what is remaining of the non-expedite period.

At clock 0, the monitor counter 240 value X is set to 500 and the non-expedite counter 242 value Y is set to 100. At clock 200 the monitor counter 240 value X is 300 and the non-expedite counter 242 value Y is 80 indicating that 20 clock cycles out of the 200 total clock cycles which passed were used to process non-expedite cycle requests and the remaining 180 clock cycles of the 200 clock cycles were used to process expedite requests. At clock 400, the monitor counter 240 value X is decremented to 100 and the non-expedite counter 242 value Y is decremented to 60 indicating that another 200 clock cycles passed out of which 20 clock cycles were devoted to processing non-expedite cycle requests and the remaining 180 clock cycles of the latest 200 clock cycles were used to process expedite cycle requests.

After 44 more clock cycles pass, the monitor counter 240 value X is 56 and the non-expedite counter 242 value Y is 56 indicating that 4 clock cycles out of the 44 clock cycles that passed were devoted to processing non-expedite cycle requests and the remaining 40 clock cycles were used to process expedite cycle requests. At this point, the monitor counter 240 value X and the non-expedite counter 242 value Y are equal. All further expedite requests must now be masked in order to meet the guaranteed non-expedite bandwidth.

At clock 500, the monitor counter 240 value X and the non-expedite counter 242 value Y are 0. The non-expedite counter 242 value Y of 0 designates that at least 20% of the given monitoring window has been provided to non-expedite cycles. Both counters are now reset to their default values at clock 501 and a new monitoring window is initiated.

In this case, 44 non-expedite clock cycles were observed during the first 444 clock cycles of the monitoring window. Then masking forced the total number of the non-expedite clocks to reach 100 within the 500 clock cycle monitoring period to provide a guaranteed 20% of the monitoring period to non-expedited cycles.

What has been described is a method and apparatus for an AGP expedite cycle throttling control mechanism. The present invention allows non-expedite cycles to be processed during a specified fraction of a given monitoring window. With the present invention, this fraction does not need to be consecutive. The fraction can accumulate over the entire monitoring window period and still guarantee the non-expedite cycles a specified minimum period of time to be processed within the monitoring window.

While certain exemplary embodiments have been described in detail and shown in the accompanying drawings, it is to be understood that such embodiments are merely for illustrative purpose and not restrictive on the broad scope of the invention, and that this invention is not to be limited to the specific arrangements and constructions shown and described, since various other modifications may occur to those with ordinary skill in the art.

What is claimed:

1. A method comprising:
   monitoring expedite and non-expedite requests in a monitoring window having a predetermined duration to determine a number of clock cycles for the expedite and the non-expedite requests, the number of cycles for the non-expedite requests being monitored by a non-expedite counter;
   arbitrating between the expedite and non-expedite requests; and
   processing the non-expedite requests for a guaranteed number of clock cycles in the monitoring window.

2. The method of claim 1 wherein the expedite cycles comprises high priority advance graphics port (AGP) cycles.

3. The method of claim 1 wherein the expedite and non-expedite requests are made to a memory device.

4. The method of claim 1 wherein monitoring the expedite requests comprises counting the number of clock cycles using a monitor counter.

5. The method of claim 1 wherein processing comprises limiting the expedite requests by a throttling design logic.

6. The method of claim 5 wherein limiting the expedite requests comprises masking the expedite cycles.

7. A method comprising:
   monitoring expedite and non-expedite requests in a monitoring window having a predetermined duration to determine a number of clock cycles for the expedite and the non-expedite requests, the number of cycles for the non-expedite requests being monitored by a non-expedite counter;
   arbitrating between the expedite and non-expedite requests;
   processing the non-expedite requests for a guaranteed number of clock cycles in the monitoring window; and
   preprogramming a monitoring window value for the monitoring window during which the number of clock cycles counted with an expedite signal asserted is monitored.

8. The method of claim 7 wherein the expedite signal provides data transfer requests causing assertion of the expedite signal to access a component with high priority.

9. The method of claim 8 wherein the clock cycles comprises expedite cycles.

10. The method of claim 8 wherein the clock cycles comprises non-expedite cycles.

11. The method of claim 10 further comprising preprogramming a minimum non-expedite count value which is the minimum processing period to be devoted to non-expedite cycles within a given monitoring window.

12. The method of claim 11 further comprising comparing the number of expedite cycles with the number of non-expedite cycles.

13. The method of claim 12 further comprising initiating masking of the expedite signal if the number of expedite cycles equals the number of non-expedite cycles.

14. The method of claim 12 further comprising resetting the monitoring window to the monitoring window value and the non-expedite period to the minimum non-expedite count value.

15. An apparatus comprising:
   a throttling decision logic configured to monitor expedite and non-expedite requests in a monitoring window having a predetermined duration to determine a number of clock cycles for expedite requests;

an arbiter coupled to the throttling decision logic to arbitrate between the expedite and non-expedite requests; and a throttling register coupled to the throttling decision logic configured to provide the throttling decision logic with the monitoring window and a value for a predetermined number of clock cycles, the arbiter processing the non-expedite requests for the predetermined number of clock cycles, the number of cycles for non-expedite requests being monitored by a non-expedite counter.

16. The apparatus of claim 15 wherein the throttling decision logic counts number of clock cycles during the monitoring window.

17. The apparatus of claim 16 wherein the clock cycles are expedite cycles.

18. The apparatus of claim 16 wherein the clock cycles are non-expedite cycles.

19. The apparatus of claim 16 wherein the throttling decision logic is provided with an expedite signal associated with data transfer requests to a component which are expedite requests.

20. The apparatus of claim 19 wherein the arbiter is configured to provide access to the data transfer requests to the component at high priority if the expedite signal is asserted.

21. The apparatus of claim 20 wherein the component comprises an accelerated graphics port device.

22. The apparatus of claim 21 wherein the throttling decision logic further comprises an expedite throttle decision logic configured to generate a mask control signal to mask the expedite signal to the arbiter to provide the non-expedite cycles a guaranteed minimum period for processing during the monitoring window.

23. The apparatus of claim 22 further comprising a monitor counter coupled to the throttling register, the monitor counter configured to monitor a processed expedite signal to determine the number of expedite cycles processed during the monitoring window.

24. The apparatus of claim 23 further comprising a non-expedite counter coupled to the throttling register, the non-expedite counter configured to monitor the processed expedite signal to determine the number of non-expedite cycles processed during the monitoring window.

25. An apparatus comprising:
a throttling decision logic configured to monitor expedite and non-expedite requests in a monitoring window having a predetermined duration to determine a number of clock cycles for expedite requests, the throttling decision logic counting number of clock cycles during the monitoring window and being provided with an expedite signal associated with data transfer requests to a component which are expedite requests, the component comprising an accelerated graphics port device, the throttling decision logic comprising an expedite throttle decision logic configured to generate a mask control signal to mask the expedite signal to the arbiter to provide the non-expedite cycles a guaranteed minimum period for processing during the monitoring window;
an arbiter coupled to the throttling decision logic to arbitrate between the expedite and non-expedite requests, the arbiter being configured to provide access to the data transfer requests to the component at high priority if the expedite signal is asserted;
a throttling register coupled to the throttling decision logic configured to provide the throttling decision logic with the monitoring window and a value for a predetermined number of clock cycles, the arbiter processing the non-expedite requests for the predetermined number of clock cycles, the number of cycles for non-expedite requests being monitored by a non-expedite counter;
a monitor counter coupled to the throttling register, the monitor counter configured to monitor a processed expedite signal to determine the number of expedite cycles processed during the monitoring window;
a non-expedite counter coupled to the throttling register, the non-expedite counter configured to monitor the processed expedite signal to determine the number of non-expedite cycles processed during the monitoring window; and
a comparator coupled to the monitoring counter and the non-expedite counter, the comparator configured to compare the number of expedite cycles counted during the monitoring window to the number of non-expedite cycles counted.

26. The apparatus of claim 25 wherein the throttling logic initiates the masking if the comparator determines that the number of expedite cycle requests processed during the monitoring window is equal to the number of non-expedite period.

27. The apparatus of claim 25 wherein the throttling logic initiates the masking if the comparator determines that the number of expedite cycle requests processed during the monitoring window is less than the number of non-expedite period.

28. The apparatus of claim 15 wherein the throttling decision logic counts number of data transfer requests during the monitoring window.

29. A system comprising:
a memory device configured to accept data transfer requests from various devices; and
a controller coupled to the memory device, the controller comprising:
a throttling decision logic configured to monitor expedite and non-expedite requests in a monitoring window having a predetermined duration to determine a number of clock cycles for the expedite requests;
an arbiter coupled to the throttling decision logic to arbitrate between the expedite and non-expedite requests; and
a throttling register coupled to the throttling decision logic configured to provide the throttling decision logic with the monitoring window and a value for a predetermined number of clock cycles, the throttling decision logic processing non-expedite requests for a guaranteed number of clock cycles in the monitoring window, the number of clock cycles for the non-expedite requests being monitored by a non-expedite counter.

30. The system of claim 29 wherein the throttling decision logic counts number of clock cycles during the monitoring window.

31. The system of claim 30 wherein the throttling decision logic counts number of data transfer requests during the monitoring window.

32. The system of claim 31 wherein the clock cycles are expedite cycles.

33. The system of claim 31 wherein the clock cycles are non-expedite cycles.

34. The system of claim 31 wherein the throttling decision logic is provided with an expedite signal associated with data transfer requests to a component which are expedite requests.

35. The system of claim 34 wherein the arbiter is configured to provide access to the data transfer requests to the component at high priority if the expedite signal is asserted.

36. The system of claim 35 wherein the component comprises an accelerated graphics port device.

37. The system of claim 36 wherein the throttling decision logic further comprises an expedite throttle decision logic configured to generate a mask control signal to mask the expedite signal to the arbiter to provide the non-expedite cycles a guaranteed minimum period for processing during the monitoring window.

38. The system of claim 37 wherein the monitor counter coupled to the throttling register, the monitor counter configured to monitor a processed expedite signal to determine the number of expedite cycles processed during the monitoring window.

39. The system of claim 38 further comprising a non-expedite counter coupled to the throttling register, the non-expedite counter configured to monitor the processed expedite signal to determine the number of non-expedite cycles processed during the monitoring window.

40. A system comprising:
a memory device configured to accept data transfer requests from various devices; and
a controller coupled to the memory device, the controller comprising:
a throttling decision logic configured to monitor expedite and non-expedite requests in a monitoring window having a predetermined duration to determine a number of clock cycles for the expedite requests, the throttling decision logic counting number of clock cycles and number of data transfer requests during the monitoring window, the throttling decision logic being provided with an expedite signal associated with data transfer requests to a component which are expedite requests, the component comprising an accelerated graphics port device, the throttling decision logic comprising an expedite throttle decision logic configured to generate a mask control signal to mask the expedite signal to the arbiter to provide the non-expedite cycles a guaranteed minimum period for processing during the monitoring window;
an arbiter coupled to the throttling decision logic to arbitrate between the expedite and non-expedite requests, the arbiter being configured to provide access to the data transfer requests to the component at high priority if the expedite signal is asserted;
a throttling register coupled to the throttling decision logic configured to provide the throttling decision logic with the monitoring window and a value for a predetermined number of clock cycles, the throttling decision logic processing non-expedite requests for a guaranteed number of clock cycles in the monitoring window, the number of clock cycles for the non-expedite requests being monitored by a non-expedite counter;
monitor counter coupled to the throttling register, the monitor counter configured to monitor a processed expedite signal to determine the number of expedite cycles processed during the monitoring window;
a non-expedite counter coupled to the throttling register, the non-expedite counter configured to monitor the processed expedite signal to determine the number of non-expedite cycles processed during the monitoring window; and
a comparator coupled to the monitoring counter and the non-expedite counter, the comparator configured to compare the number of expedite cycles counted during the monitoring window to the number of non-expedite cycles counted.

41. The system of claim 40 wherein the throttling logic initiates the masking if the comparator determines that the number of expedite cycle requests processed during the monitoring window is equal to the number of non-expedite period.

42. The system of claim 40 wherein the throttling logic initiates the masking if the comparator determines that the number of expedite cycle requests processed during the monitoring window is less than the number of non-expedite period.

* * * * *